United States Patent
Shiraki et al.

(10) Patent No.: US 11,584,265 B2
(45) Date of Patent: Feb. 21, 2023

(54) SEAT SLIDER DEVICE

(71) Applicant: TOYOTA BODY SEIKO CO., LTD., Takahama (JP)

(72) Inventors: Shin Shiraki, Takahama (JP); Motohisa Nakamura, Takahama (JP); Yoshifumi Naka, Obu (JP)

(73) Assignee: TOYOTA BODY SEIKO CO., LTD., Takahama (JP)

( * ) Notice: Subject to any disclaimer, the term of this patent is extended or adjusted under 35 U.S.C. 154(b) by 0 days.

(21) Appl. No.: 17/588,954

(22) Filed: Jan. 31, 2022

(65) Prior Publication Data

US 2022/0258653 A1 Aug. 18, 2022

(30) Foreign Application Priority Data

Feb. 15, 2021 (JP) .............................. JP2021-021647

(51) Int. Cl.
- *B60N 2/00* (2006.01)
- *B60N 2/12* (2006.01)
- *B60N 2/07* (2006.01)

(52) U.S. Cl.
CPC ............. *B60N 2/12* (2013.01); *B60N 2/0722* (2013.01)

(58) Field of Classification Search
None
See application file for complete search history.

(56) References Cited

U.S. PATENT DOCUMENTS

| | | | |
|---|---|---|---|
| 5,785,292 A * | 7/1998 | Muraishi | B60N 2/071 248/432 |
| 6,691,971 B2 * | 2/2004 | Yamada | B60N 2/0705 248/430 |
| 10,059,229 B2 * | 8/2018 | Kume | B60N 2/0715 |
| 10,059,230 B2 * | 8/2018 | Kume | A47C 1/12 |
| 10,220,731 B2 * | 3/2019 | Kume | B60N 2/0707 |
| 2013/0020459 A1 * | 1/2013 | Moriyama | B60N 2/0722 248/636 |
| 2014/0110554 A1 * | 4/2014 | Oya | B60N 2/0722 248/430 |
| 2020/0001745 A1 * | 1/2020 | Shimizu | B21D 47/01 |
| 2022/0017000 A1 * | 1/2022 | Zhao | B60N 2/0715 |

FOREIGN PATENT DOCUMENTS

JP 2018-47777 A 3/2018

* cited by examiner

*Primary Examiner* — Steven M Marsh
(74) *Attorney, Agent, or Firm* — Oliff PLC

(57) ABSTRACT

A seat slider device may include: a lower rail attached to a body of a vehicle; and an upper rail attached to a seat and slidable with respect to the lower rail. The upper rail may include: a roller or a slider piece being in contact with a bottom plate of the lower rail; and a protrusion supporting the roller or the slider piece. The protrusion may be integrated with the upper rail.

4 Claims, 6 Drawing Sheets

SEAT SLIDER DEVICE

CROSS-REFERENCE TO RELATED APPLICATION

This application claims priority to Japanese patent application No. 2021-021647, filed on Feb. 15, 2021, the entire contents of which are incorporated herein by reference.

TECHNICAL FIELD

The technique disclosed herein relates to a seat slider device configured to slide a seat of a vehicle.

BACKGROUND

A seat slider device configured to slide a seat includes a lower rail attached to a body of a vehicle and an upper rail attached to a lower portion of the seat. The upper rail is slidable with respect to the lower rail. A roller is attached to the upper rail, and the roller is in contact with a bottom plate of the lower rail. An example of such a seat slider device is disclosed in Japanese Patent Application Publication No. 2018-47777. Due to rotation of the roller, the upper rail smoothly slides.

SUMMARY

In the seat slider device of Japanese Patent Application Publication No. 2018-47777, the rollers are each supported by the upper rail by using a pin. The pin passes through a plate of the upper rail. The present disclosure provides a technique with an improved structure for attaching a roller to reduce cost of a support structure for the roller (or a slider piece).

The seat slider device disclosed herein may comprise a lower rail attached to a body of a vehicle; and an upper rail attached to a seat and slidable with respect to the lower rail. The upper rail may comprise a roller or a slider piece being in contact with a bottom plate of the lower rail and a protrusion supporting the roller or the slider piece. The protrusion may be integrated with the upper rail. By virtue of the protrusion supporting the roller or the slider piece being integrated with the upper rail, cost of a support structure for the roller or the sliding piece (manufacturing cost of the protrusion) can be reduced.

A hollow space may be defined in the protrusion. By virtue of the hollow space being defined in the protrusion, cost of a material of the protrusion can be reduced, and weight of the protrusion can be reduced. Deformation processing (for example, presswoking) is suitable for making the protrusion, which includes the hollow space therein, integrated with the upper rail. Employing the deformation processing can effectively reduce the manufacturing cost of the protrusion.

The typical roller may comprise an inner ring fixed to the protrusion, an outer ring arranged radially outward of the inner ring; and rolling members arranged between the inner ring and the outer ring. In this case, the protrusion may comprise: a large diameter portion being in contact with a side surface of the inner ring; and a small diameter portion passed into the inner ring, and the hollow space in the protrusion may comprise a large diameter hole corresponding to the large diameter portion and a small diameter hole corresponding to the small diameter portion. In other words, both the exterior and interior profiles of the protrusion have two steps. By virtue of both the exterior and interior profiles of the protrusion having two steps, rigidity of the protrusion can be increased to firmly support the roller. Further, by virtue of the side surface of the inner ring being in contact with the large diameter portion, a space can be provided between a side plate of the upper rail and the outer ring to allow the outer ring to smoothly rotate.

An end of a side surface of the protrusion may comprise an expanded portion expanded outward and the inner ring is fixed by the expanded portion. The inner ring of the roller can be fixed to the protrusion by using a simple configuration, and manufacturing cost of the support structure for the roller can further be reduced. The end of the protrusion may be opened.

Details and further improvements of the technique disclosed herein will be described in Detailed Description below.

DETAILED DESCRIPTION

Figure 1:
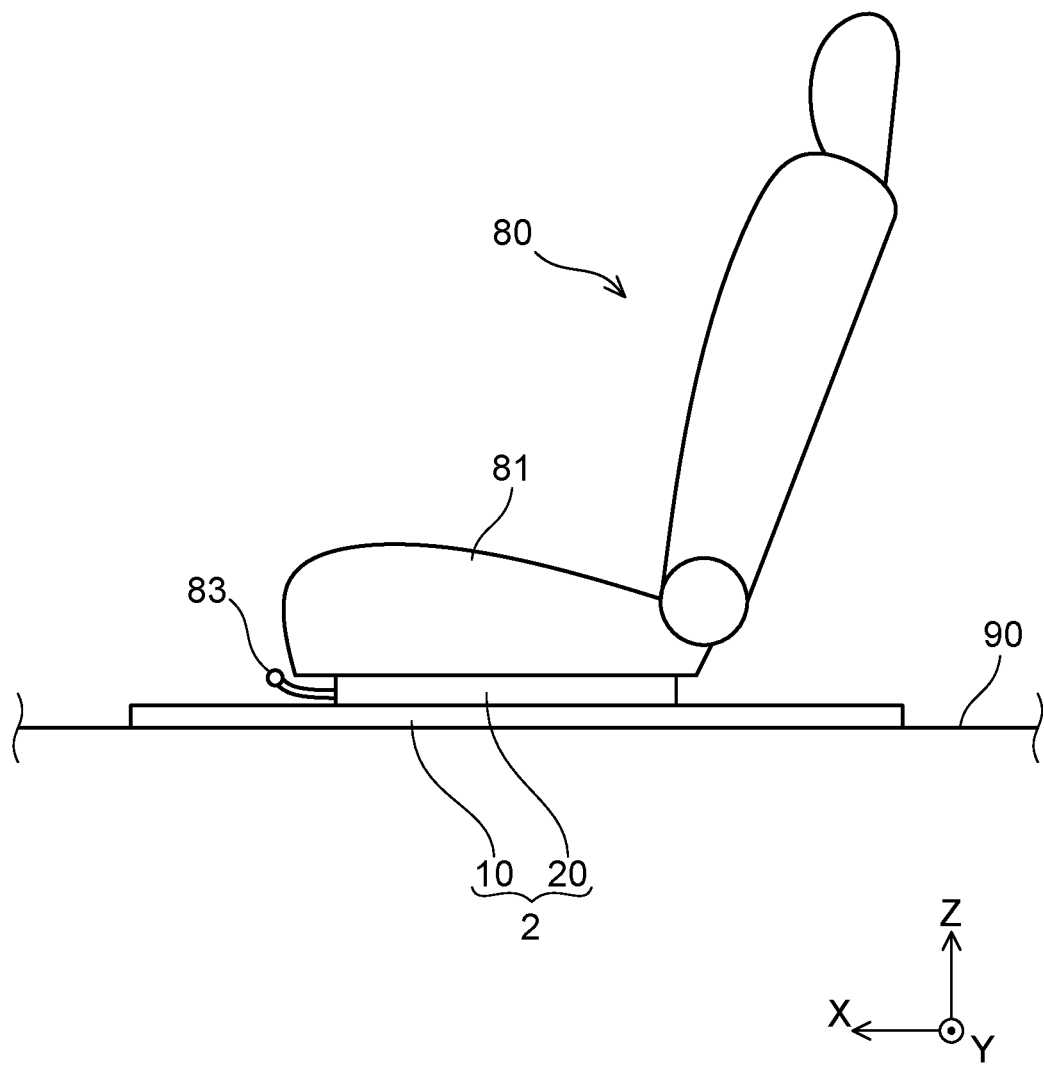
FIG. 1 illustrates a side view of a seat slider device of an embodiment.

A seat slider device 2 of an embodiment will be described with reference to drawings. FIG. 1 illustrates a side view of the seat slider device 2 attached to a vehicle. The seat slider device 2 is constituted of a lower rail 10 and an upper rail 20. The lower rail 10 is an elongate member. The upper rail 20 is attached to the lower rail 10 such that the upper rail 20 is slidable with respect to the lower rail 10 in its longitudinal direction. The lower rail 10 is fixed to a floor panel 90 of a body of the vehicle. The upper rail 20 is attached to a lower portion of a seat cushion 81 of a seat 80. The upper rail 20 is attached to the lower portion of the seat cushion 81 via a frame (not illustrated). The seat slider device 2 is attached to the lower portion of the seat cushion 81 on the right side and another seat slider device 2 is attached to the lower portion of the seat cushion 81 on the left side. An x-direction in the coordinate system in the drawing corresponds to the rail longitudinal direction. A y-direction corresponds to a rail short direction. A +Z direction in the coordinate system of the drawing indicates an upward direction. Positional relationships between coordinate axes and portions of the seat slider device 2 are the same in all the drawings.

A lock lever 83 extends forward from the frame (not shown). The upper rail 20 is locked (fixed) with respect to the lower rail 10 in its normal state. When a user operates the lock lever 83, the upper rail 20 is unlocked, which allows the upper rail 20 (the seat 80) to slide with respect to the lower rail 10.

Figure 2:
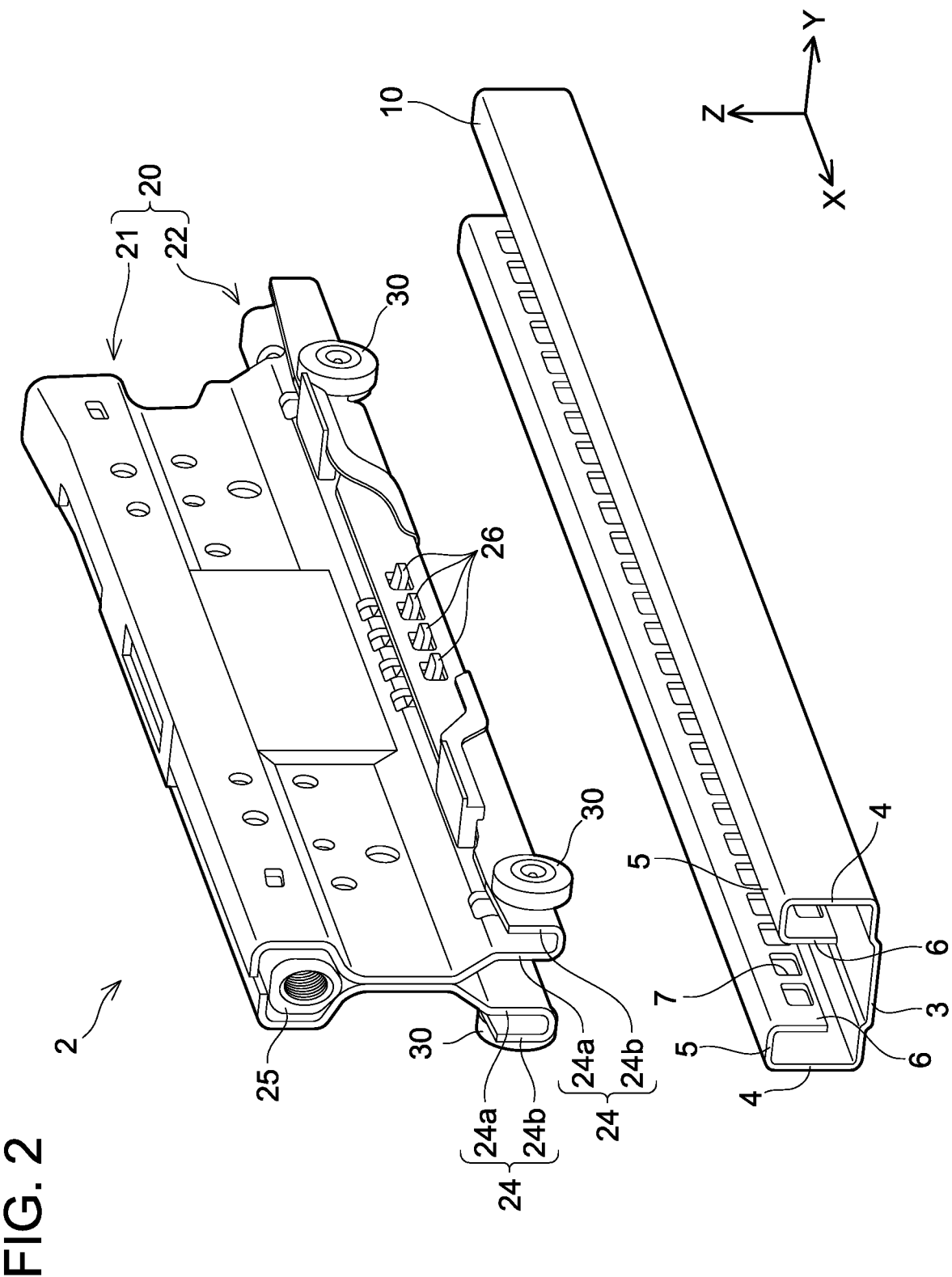
FIG. 2 illustrates perspective views of an upper rail and a lower rail.

FIG. 2 illustrates a perspective view in which the upper rail 20 is separated from the lower rail 10. First, a profile of the lower rail 10 will be described. The lower rail 10 includes a bottom plate 3 attached to the body of the vehicle (the floor panel 90) and a pair of outer vertical plates 4, a pair of upper plates 5, and a pair of inner vertical plates 6. The pair of outer vertical plates 4 respectively extends upward from the opposite ends of the bottom plate 3 in the rail short direction (the y-direction in the drawing). The pair of upper plates 5 respectively extends laterally toward the center in the rail short direction from the upper ends of the outer vertical plates 4. The pair of inner vertical plates 6 respectively extends downward from the inner ends of the upper plates 5. The pair of inner vertical plates 6 faces each other. A plurality of lock holes 7 lined up in the rail longitudinal direction is defined in each of the pair of inner vertical plates 6. The lower rail 10 has an opening that is open upward between the pair of the inner vertical plates 6. An upper surface of the lower rail 10 has the elongated opening along the rail longitudinal direction.

The upper rail 20 will be described. A lower body 22 of the upper rail 20 is positioned within the lower rail 10, and an upper body 21 of the upper rail 20 protrudes upward beyond the lower rail 10 through the opening in the lower rail 10. It is to be noted that FIG. 2 illustrates the upper rail 20 as being separated from the lower rail 10, thus the lower body 22 is illustrated as being separated from the lower rail 10 as well.

Lock pins 26 protrude in the rail short direction (the y-direction) at the center of the lower body 22 of the upper rail 20 in the rail longitudinal direction. The lock pins 26 engage with the lock holes 7 in the lower rail 10 to fix the upper rail 20 to the lower rail 10.

Although explanations of the details are omitted, the lock pins 26 retract toward the inside of the lower body 22 following the motion of with the lock lever 83 illustrated in FIG. 1. In other words, when an occupant raises the lock lever 83, the lock pins 26 retract and are released from the lock holes 7, by which the upper rail 20 is unlocked to permit the upper rail 20 to move with respect to the lower rail 10.

Nut members 25 are disposed at the ends of the upper body 21 of the upper rail 20. The frame of the seat 80 is fixed to the nut members 25 with bolts (not illustrated). In other words, the seat 80 is fixed to the upper rail 20. The nut members 25 are disposed at the opposite ends of the upper body 21 in the rail longitudinal direction.

The lower body 22 of the upper rail 20 includes side plates 24 that are curved into U-shapes when viewed in the rail longitudinal direction. In each of the U-shaped side plates 24, a plate proximate to the center of the upper rail 20 in the rail short direction (the y-direction) is referred to as a U-shaped inner plate 24a, and a plate further from the center is referred to as a U-shaped outer plate 24b.

Each U-shaped outer plate 24b is in a space between corresponding one of the outer vertical plates 4 and corresponding one of the inner vertical plates 6 of the lower rail 10. Rollers 30 are each supported by corresponding one of the side plates 24 (the U-shaped outer plates 24b) of the upper rail 20. Each of the rollers 30 is also in the space between the corresponding one of the outer vertical plates 4 and the corresponding one of the inner vertical plates 6 of the lower rail 10. Outer circumferential surfaces of the rollers 30 are in contact with the bottom plate 3 of the lower rail 10. The rollers 30 rotate in conjunction with the movement of the upper rail 20, and the upper rail 20 thereby moves smoothly.

Figure 3:
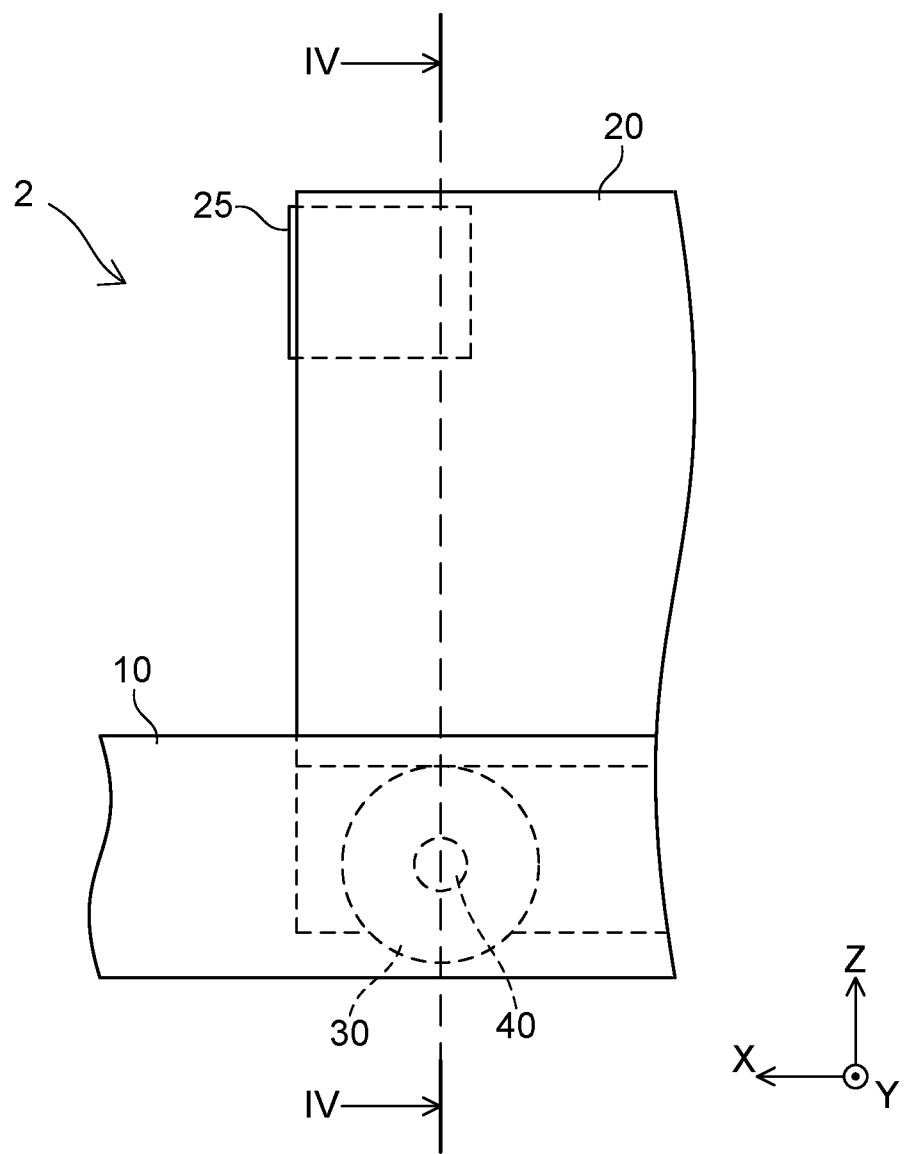
FIG. 3 illustrates a side view of the seat slider device.
Figure 4:
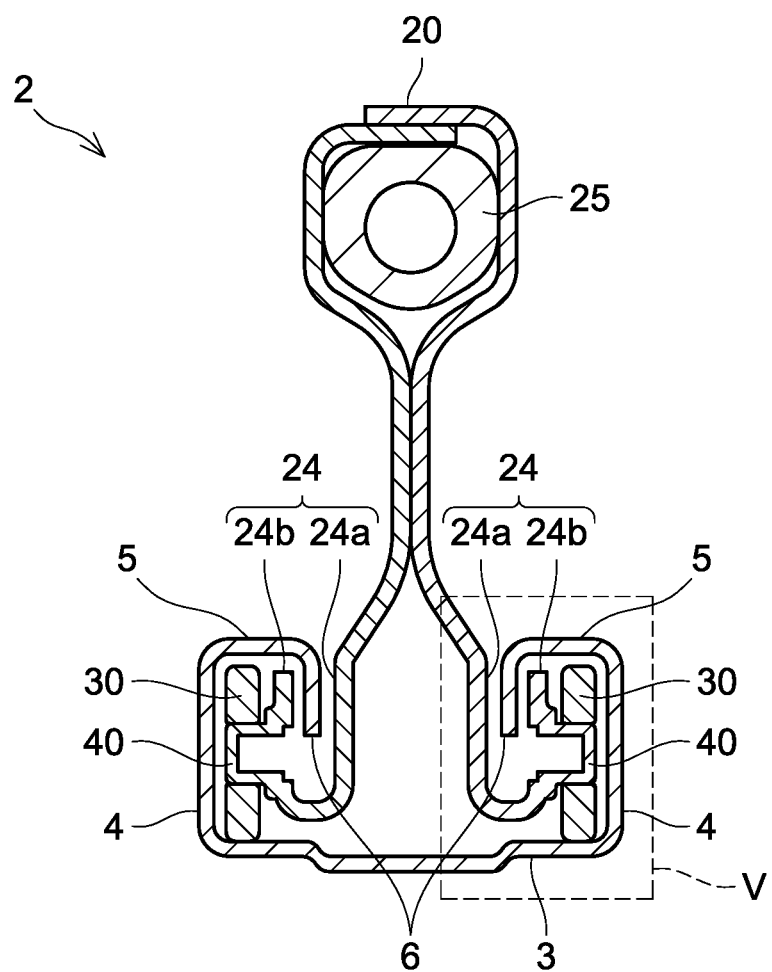
FIG. 4 illustrates a cross-sectional view along a line IV-IV of FIG. 3.

A support structure for each of the rollers 30 will be described. FIG. 3 illustrates a side view of a front portion of the seat slider device 2. FIG. 4 illustrates a cross-section along a line IV-IV of FIG. 3. FIG. 4 illustrates a cross-section provided by cutting the seat slider device 2 along a plane that is perpendicular to the rail longitudinal direction (the x-direction) and passing though protrusions 40 supporting the rollers 30. As described above, each of the rollers 30 and each of the U-shaped outer plates 24b of the upper rail 20 are positioned between the corresponding one of the inner vertical plates 6 and the corresponding one of the outer vertical plates 4 of the lower rail 10, and the roller 30 is supported by the U-shaped outer plate 24b. More specifically, each of the rollers 30 is supported by the protrusion 40 provided on the corresponding U-shaped outer plate 24b. The protrusions 40 are provided by performing pressworking on the U-shaped outer plates 24b.

Figure 5:
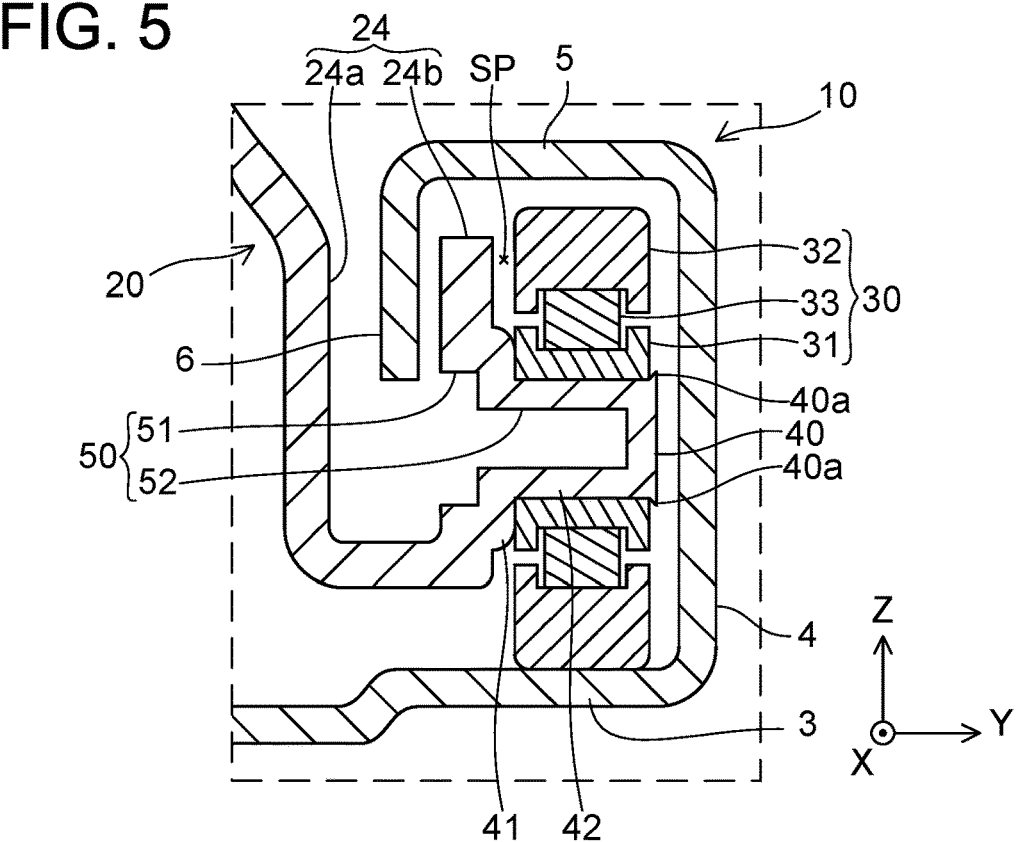
FIG. 5 illustrates an enlarged view of an area of FIG. 4 surrounded by a rectangle V in a broken line.
Figure 6:
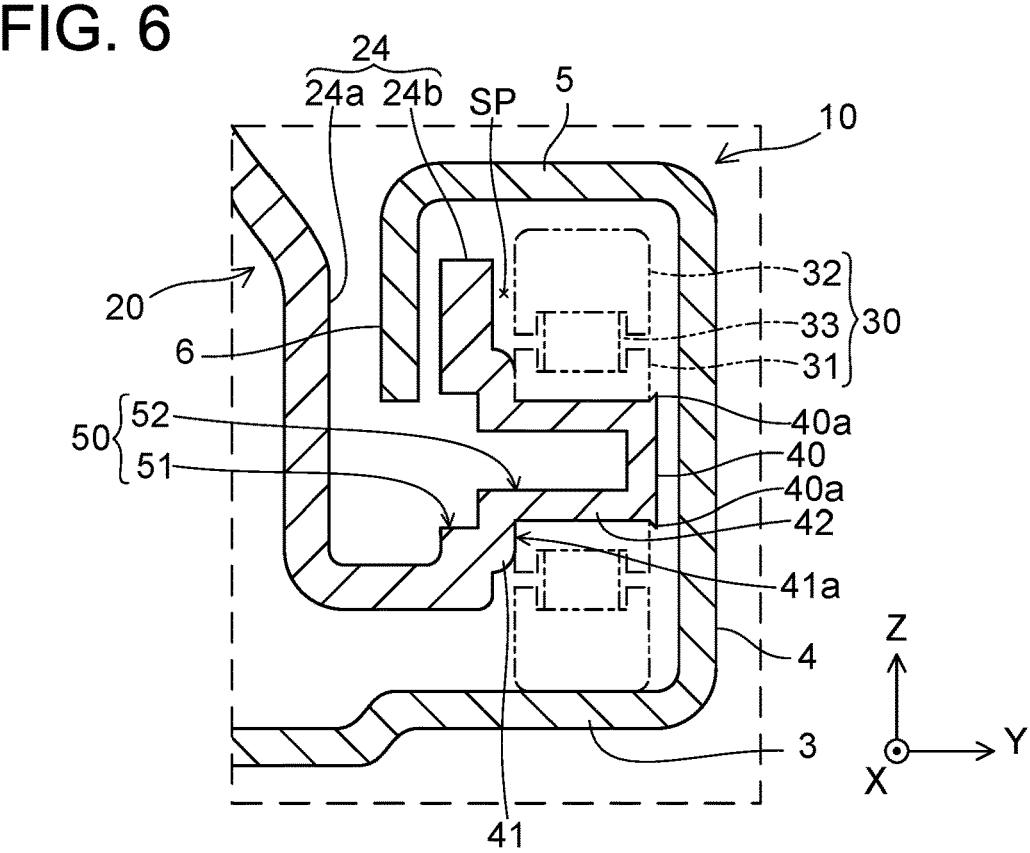
FIG. 6 illustrates the enlarged view of the area of FIG. 4 surrounded by the rectangle V in a broken line (the roller is illustrated in a virtual line).

FIG. 5 illustrates an enlarged view of an area of FIG. 4 surrounded by a rectangle V in a broken line. FIG. 6 is the same figure as FIG. 5, but the roller 30 is illustrated in a virtual line for easier understanding of a profile of the protrusion 40. The rollers 30 are respectively disposed on the right and left sides of the upper rail 20, and the support structure for the roller 30 on the right side is identical to the support structure for the roller 30 on the left side. The support structure for the roller 30 on the left side of FIG. 4 is the same as the support structure illustrated in FIGS. 5 and 6.

Each of the rollers 30 is a bearing, and as illustrated in FIG. 5, each of the rollers 30 is constituted of an inner ring 31, an outer ring 32, and a plurality of rolling members 33. FIG. 4 illustrates each of the rollers 30 in a simplified manner. The inner ring 31 and the outer ring 32 are rings, and the plurality of rolling members 33 are held between the inner ring 31 and the outer ring 32. The inner ring 31 is fixed to one of the protrusions 40. The plurality of rolling members 33 moves along the circumference of the inner ring 31, and the outer ring 32 smoothly rotates.

Each of the protrusions 40 is provided by press working operation, and a hollow space 50 is defined inside each of the protrusions 40. The hollow space 50 is opened at the corresponding side plate 24 of the upper rail 20 on the side where the protrusion 40 is provided (i.e., at the U-shaped outer plate 24b). The protrusion 40 is formed by pressing a punch against the U-shaped outer plate 24b. Alternatively, the protrusion 40 is formed by deep drawing. Both the process of pressing a punch against a metal sheet (sheet pressing) and the deep drawing are types of pressworking.

Specifically, each of the protrusions 40 includes a large diameter portion 41 formed at a portion proximate to the corresponding one of the U-shaped outer plates 24b and a small diameter portion 42 formed from the large diameter portion 41 toward the end of the protrusion 40 (see FIGS. 5, 6). An outer diameter of the small diameter portion 42 is smaller than an outer diameter of the large diameter portion 41. The inner ring 31 of the roller 30 fits into the small diameter portion 42, and a side surface of the inner ring 31 makes contact with a side surface 41a of the large diameter portion 41. The outer diameter of the large diameter portion 41 is smaller than an inner diameter of the outer ring 32 of the roller 30. The large diameter portion 41 protrudes from the side surface of the U-shaped outer plate 24b, and a space SP is provided between the outer ring 32 and the U-shaped outer plate 24b. Consequently, the outer ring 32 can smoothly rotate without making contact with the U-shaped outer plate 24b.

A side surface end 40a of each of the protrusions 40 is expanded outward in a circumferential direction of the protrusion 40. The side surface end 40a that is expanded outward may be referred to as an expanded portion 40a. The inner ring 31 fitted into the small diameter portion 42 is held by the side surface 41a of the large diameter portion 41 and the expanded portion 40a, by which the inner ring 31 is firmly fixed by the protrusion 40. The side surface end 40a (the expanded portion 40a) of the protrusion 40 is expanded outward by pressing a punch against a top surface of the protrusion 40. The inner ring 31 can be fixed to corresponding one of the protrusions 40 (the upper rail 20) with a simple process of expanding the side surface end 40a of each of the protrusions 40. Cost to attach the rollers 30 can be reduced.

The exterior profile of each of the protrusions 40 is constituted of the large diameter portion 41 and the small diameter portion 42. Corresponding to this, the hollow space 50 inside each of the protrusions 40 includes a large diameter hole 51 and a small diameter hole 52. In other words, the large diameter hole 51 is defined to correspond to the large diameter portion 41 and the small diameter hole 52 is defined to correspond to the small diameter portion 42. As described above, each of the protrusions 40 is formed by drawing. The large diameter portion 41 and the small diameter portion 42 (the large diameter hole 51 and the small diameter hole 52) are formed by, for example, two-step deep drawing.

Advantages of the protrusions 40 will be described. Each of the protrusions 40 has the hollow space 50 therein, thus is lightweight. By virtue of employing the protrusions 40 including the hollow spaces 50, weight of the upper rail 20 (the seat slider device 2) can be reduced. Cost of a material of the protrusions 40 can also be reduced.

The protrusions 40 including the hollow spaces 50 are formed by pressworking. By virtue of employing pressworking, the manufacturing cost of the protrusions 40 (cost of the support structures for the rollers) can be reduced. Further, if the protrusions are formed by attaching pins to the U-shaped outer plates 24b, holes need to be defined in the U-shaped inner plates 24a for processing so as to press jigs to fix the pins through the holes for processing. If the holes for processing are defined in the U-shaped inner plates 24a, this reduces rigidity of the side plates 24 in proximity of where the rollers 30 are fixed. By virtue of forming the protrusions 40 by pressworking, it is unnecessary to define the holes for processing in the U-shaped inner plates 24a, and decrease in the rigidity of the side plates 24 in proximity of where the rollers 30 are fixed can be prevented.

The protrusions 40 are formed by pressworking (deep drawing or sheet pressing). In other words, each of the side plates 24 and its corresponding one of the protrusions 40 are constituted of the same material and continuous (seamless). It is desirable that the protrusions 40 are formed by deformation processing by which a shape of a die is transferred to a metal plate. The protrusions 40 may be formed by deformation processing other than pressworking, for example by forging. Employing forging provides an advantage of material hardening (hardening achieved by processing). When the protrusions 40 are formed by deformation processing, the material may be at any temperature.

Each of the protrusions 40 includes the large diameter portion 41 and the small diameter portion 42, and the hollow space 50 in each of the protrusions 40 also includes the large diameter hole 51 and the small diameter hole 52. The exterior profile of each of the protrusions 40 has two steps, and the hollow space 50 therein also has two steps. By virtue of both the exterior and interior profiles of each of the protrusions 40 having two steps, rigidity of the protrusions 40 increases. In other words, the rollers 30 can firmly be supported.

Figure 7:
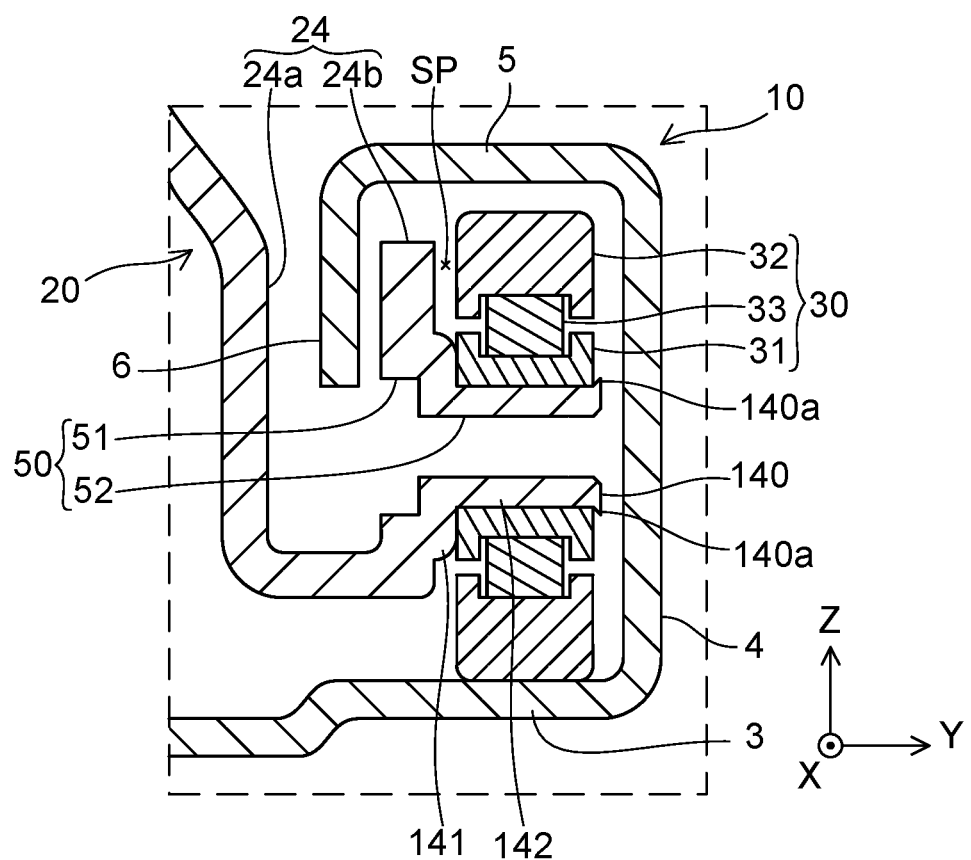
FIG. 7 illustrates an enlarged view illustrating a protrusion of a variant.

FIG. 7 illustrates a protrusion 140 of a variant. FIG. 7 illustrates an enlarged cross-section corresponding to FIG. 5. An end of the protrusion 140 is opened, and the hollow space 50 inside the protrusion 140 communicates with the outside of the protrusion 140. As in this variant, the end of the protrusion 140 may be opened. In this case, by pressing a punch against the opening in the end of the protrusion 140, a side surface end 140a can be expanded. The side surface end 140a expanded outward may hereafter be referred to as an expanded portion 140a. A small diameter portion 142 of the protrusion 140 is inserted into the inner ring 31 of the roller 30, and the inner ring 31 is held between a side surface of the large diameter portion 141 and the expanded portion 140a.

Points to be noted concerning the technique described in the embodiment will be explained. Each of the protrusions 40 is integrated with the corresponding one of the side plates 24 at the lower body 22 of the upper rail 20. When the upper rail 20 is constituted of a plurality of parts, the protrusions 40 may be integrated with any of the plurality of parts constituting the upper rail 20. For example, when metal brackets or metal reinforcing plates are attached to the side plates 24, the protrusions 40 may be integrated with the brackets or the reinforcing plates. In either case, the protrusions 40 are integrated with the upper rail 20.

Instead of the rollers 30, slider pieces may be supported by the protrusions 40. The slider pieces may be rectangular cuboids with bottom surfaces or may have trapezoidal profiles when viewed from the side of the upper rail 20. When the upper rail 20 moves with respect to the lower rail 10, the bottom surfaces of the rectangular cuboid slider pieces or the bottom surfaces of the trapezoid slider pieces slide with respect to the bottom plate 3 of the lower rail 10. Each of the slider pieces may include a through hole in the rail short direction (the y-direction in the drawing) into which corresponding one of the protrusions 40 fits. In other words, the slider pieces may be swingably supported by the protrusions 40. By the slider pieces swinging, the slider pieces well follow upward and downward curves of the bottom plate 3 of the lower rail 10.

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A seat slider device comprising:
   a lower rail attached to a body of a vehicle; and
   an upper rail attached to a seat and slidable with respect to the lower rail;
   wherein
   the upper rail comprises:
      a roller or a slider piece being in contact with a bottom plate of the lower rail; and
      a protrusion integrated with the upper rail and supporting the roller or the slider piece, a hollow space being defined in the protrusion,
   the roller comprises:
      an inner ring fixed to the protrusion;
      an outer ring arranged radially outward of the inner ring; and rolling members arranged between the inner ring and the outer ring, the protrusion comprises:
- a large diameter portion being in contact with a side surface of the inner ring; and
- a small diameter portion passed into the inner ring, and the hollow space in the protrusion comprises:
- a large diameter hole corresponding to the large diameter portion; and
- a small diameter hole corresponding to the small diameter portion.

2. The seat slider device of claim 1, wherein an end of a side surface of the protrusion comprises an expanded portion expanded outward, and the inner ring is fixed by the expanded portion.

3. The seat slider device of claim 1, wherein an end of the protrusion is opened.

4. The seat slider device of claim 1, wherein the protrusion is formed by deformation processing.

\* \* \* \* \*